United States Patent
Sumi et al.

(10) Patent No.: US 10,913,917 B2
(45) Date of Patent: *Feb. 9, 2021

(54) INTERNAL COMBUSTION ENGINE LUBRICATING OIL COMPOSITION

(71) Applicant: ADEKA CORPORATION, Tokyo (JP)

(72) Inventors: Taro Sumi, Tokyo (JP); Shinji Iino, Tokyo (JP)

(73) Assignee: ADEKA CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/312,081

(22) PCT Filed: Jun. 27, 2017

(86) PCT No.: PCT/JP2017/023617
§ 371 (c)(1),
(2) Date: Dec. 20, 2018

(87) PCT Pub. No.: WO2018/003812
PCT Pub. Date: Jan. 4, 2018

(65) Prior Publication Data
US 2019/0203146 A1    Jul. 4, 2019

(30) Foreign Application Priority Data

Jun. 29, 2016 (JP) ................................ 2016-128697

(51) Int. Cl.
| | | |
|---|---|---|
| *C10M 141/10* | (2006.01) | |
| *C10M 133/16* | (2006.01) | |
| *C10M 139/00* | (2006.01) | |
| *C10M 141/12* | (2006.01) | |
| *C10M 129/10* | (2006.01) | |
| *C10M 137/10* | (2006.01) | |
| *C10M 135/18* | (2006.01) | |
| *C10M 141/08* | (2006.01) | |
| C10N 10/04 | (2006.01) | |
| C10N 10/12 | (2006.01) | |
| C10N 20/02 | (2006.01) | |
| C10N 30/06 | (2006.01) | |
| C10N 30/10 | (2006.01) | |
| C10N 40/25 | (2006.01) | |

(52) U.S. Cl.
CPC ........ *C10M 141/10* (2013.01); *C10M 129/10* (2013.01); *C10M 133/16* (2013.01); *C10M 135/18* (2013.01); *C10M 137/10* (2013.01); *C10M 139/00* (2013.01); *C10M 141/08* (2013.01); *C10M 141/12* (2013.01); C10M 2203/0206 (2013.01); C10M 2215/223 (2013.01); C10M 2219/066 (2013.01); C10M 2223/047 (2013.01); *C10M 2227/061* (2013.01); *C10N 2010/04* (2013.01); *C10N 2010/12* (2013.01); *C10N 2020/02* (2013.01); *C10N 2030/06* (2013.01); *C10N 2030/10* (2013.01); *C10N 2040/252* (2020.05); *C10N 2040/255* (2020.05)

(58) Field of Classification Search
CPC .... C10M 2203/0206; C10M 2219/066; C10M 2223/047; C10M 2227/061; C10M 2215/223; C10N 2240/104; C10N 2210/06; C10N 2210/02; C10N 2230/10; C10N 2230/06; C10N 2220/022; C10N 2240/102; C10N 2040/25; C10N 2010/04
See application file for complete search history.

(56) References Cited

U.S. PATENT DOCUMENTS

| | | | | |
|---|---|---|---|---|
| 8,722,597 B2* | 5/2014 | Tatsumi | ............... | C10M 137/00 508/364 |
| 2010/0269781 A1* | 10/2010 | Derevjanik | .......... | C10M 163/00 123/196 R |
| 2014/0342958 A1* | 11/2014 | Kubo | ................... | C10M 169/04 508/364 |

FOREIGN PATENT DOCUMENTS

| | | |
|---|---|---|
| JP | 2000-192068 | 7/2000 |
| JP | 2001-131570 | 5/2001 |
| JP | 2006-502287 | 1/2006 |
| JP | 2006-117733 | 5/2006 |
| JP | 2008-101144 | 5/2008 |
| JP | 2008-214641 | 9/2008 |
| JP | 2012-62348 | 3/2012 |
| JP | 2013-133453 | 7/2013 |
| JP | 2014-125630 | 7/2014 |
| WO | 96/15211 | 5/1996 |
| WO | 2006/043527 | 4/2006 |
| WO | 2011/161982 | 12/2011 |

OTHER PUBLICATIONS

International Search Report dated Aug. 1, 2017 in International (PCT) Application No. PCT/JP2017/023617.

* cited by examiner

*Primary Examiner* — Vishal V Vasisth
(74) *Attorney, Agent, or Firm* — Wenderoth, Lind & Ponack, L.L.P.

(57) ABSTRACT

An internal combustion engine lubricating oil composition containing a base oil that is a hydrocarbon oil containing less than 1% by mass of aromatic components and having a sulphur content of less than 20 ppm by mass; a specific organic molybdenum compound as a component (A) at 300 to 1500 ppm by mass as molybdenum atoms; and a borate ester compound as a component (B) at 100 to 1000 ppm by mass as boron atoms.

6 Claims, No Drawings

INTERNAL COMBUSTION ENGINE LUBRICATING OIL COMPOSITION

This application is a 371 of PCT/JP2017/023617, filed Jun. 27, 2017.

TECHNICAL FIELD

The present invention relates to an internal combustion engine lubricating oil composition containing an organic molybdenum compound.

BACKGROUND ART

In order to promote reduction of automobile fuel consumption, improvements in engine oils are being investigated together with reduction of the body weight of automobiles, improvement of engines and improvement of automobiles per se. For engine oils, reduction of fuel consumption by reducing engine oil viscosity and friction is being investigated. However, reduction of viscosity causes a problem of increased wear loss on metal surfaces. Therefore, engine oils have been studied which contain organic molybdenum compounds as a friction regulator that can reduce friction and suppress the wear on metal surfaces even if the engine oils have low viscosity (for example, see Patent Documents 1 to 3).

Meanwhile, in view of efficient use of resources, reduction of waste oil, cost reduction for users of lubricating oils and the like, there is a demand for engine oils having long drain intervals, and there is a need for engine oils that can withstand long-term use under severe conditions such as high temperatures and highly oxidative states.

Engine oils containing organic molybdenum compounds exhibit excellent lubricity in the early stages of use. However, there is such a problem that the lubricity decreases with deterioration of engine oils, and after long periods of use, the lubricity exhibited is merely equivalent to that of engine oils without organic molybdenum compounds. Therefore, there is a need for development of compositions that can delay decomposition of organic molybdenum compounds and maintain the lubricity over a long period. In order to delay decomposition of organic molybdenum compounds, improving the oxidation prevention of engine oils is effective, base oils containing high amounts of aromatic components (for example, see Patent Documents 4 and 5) have a higher oxidation prevention effect than base oils containing high amounts of paraffin components, and known methods (for example, see Patent Documents 6 to 8) include adding compounds having an oxidation prevention effect such as phenolic antioxidants, amine antioxidants and zinc dithiophosphate compounds.

CITATION LIST

Patent Literature

[Patent Document 1] Japanese Patent Application Publication No. 2000-192068
[Patent Document 2] WO 2011/161982
[Patent Document 3] Japanese Patent Application Publication No. 2013-133453
[Patent Document 4] Japanese Patent Application Publication No. 2006-117733
[Patent Document 5] Japanese Patent Application Publication No. 2008-214641
[Patent Document 6] Japanese Patent Application Publication No. 2000-192068
[Patent Document 7] Japanese Patent Application Publication No. 2008-101144
[Patent Document 8] Japanese Patent Application Publication No. 2012-062348

SUMMARY OF INVENTION

Technical Problem

However, base oils containing high amounts of aromatic components have a low viscosity index and the drawback they tend to generate sludge at high temperatures when used as engine oils. In addition, improvement of oxidation prevention effects by phenolic antioxidants and amine antioxidants has limitations, and when added at high amounts, the effect of lubricity improvement by organic molybdenum compounds may be inhibited. Further, when high amounts of zinc dithiophosphate compounds are added, engine oils have high phosphorus content and exhaust gas purification catalysts may be toxified. An object of the present invention is to provide an engine oil composition that contains a base oil containing a low amount of aromatic components and can maintain lubricity because the organic molybdenum compound is barely decomposed during long-term use without containing high amounts of an antioxidant or a zinc dithiophosphate compound.

Solution to Problem

The inventors of the present invention carried out extensive studies in order to solve the above problem and, as a result, found that addition of a borate ester compound prevents an organic molybdenum compound from being decomposed under high temperature and highly oxidative conditions and the lubricity may be maintained over a long period, thereby completing the present invention. Thus, the present invention is an internal combustion engine lubricating oil composition containing a base oil that is a hydrocarbon oil containing less than 1% by mass of aromatic components and having a sulphur content of less than 20 ppm by mass; at least one organic molybdenum compound, as a component (A), selected from the group consisting of a compound represented by the following general formula (1) and a compound represented by the following general formula (2) at 300 to 1500 ppm by mass as molybdenum atoms; and a borate ester compound, as a component (B), at 100 to 1000 ppm by mass as boron atoms:

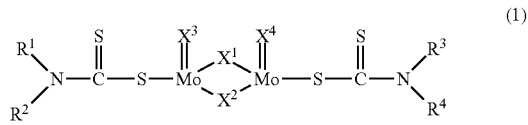

(1)

wherein $R^1$ to $R^4$ respectively represent a hydrocarbon group having 1 to 18 carbon atoms, and $X^1$ to $X^4$ respectively represent an oxygen atom or a sulphur atom;

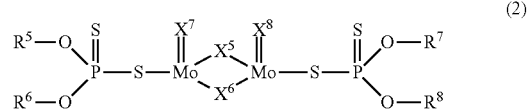

(2)

wherein $R^5$ to $R^8$ respectively represent a hydrocarbon group having 1 to 18 carbon atoms, and $X^5$ to $X^8$ respectively represent an oxygen atom or a sulphur atom.

Advantageous Effects of Invention

The internal combustion engine lubricating oil composition of the present invention can be used as a lubricating oil over a long period because the organic molybdenum compound in the lubricating oil composition is stable over a long period even under high temperatures and highly oxidative conditions.

DESCRIPTION OF EMBODIMENTS

[Base Oil]

In the internal combustion engine lubricating oil composition of the present invention, the base oil is a hydrocarbon oil containing less than 1% by mass of aromatic components and having a sulphur content of less than 20 ppm by mass. As used herein, the aromatic components in the base oil are a value obtained by measurement according to IP 346 defined by the Institute of Petroleum, and the sulphur content is a value obtained by measurement according to JIS K2541-7.

Mineral oil contains various aromatic components such as monocyclic aromatic components, bicyclic aromatic components, tricyclic aromatic components and polycyclic aromatic components. When the aromatic components derived from the base oil used in the present invention are 1% by mass or more, the organic molybdenum compound is liable to be decomposed. The content of the aromatic components derived from the base oil used in the present invention is preferably less than 0.8% by mass, more preferably less than 0.5% by mass and the most preferably less than 0.2% by mass.

Mineral oils contain sulphur compounds such as thiophene compounds and sulphide compounds. When the sulphur content in the base oil used in the present invention is 20 ppm by mass or more, exhaust gas purification catalysts are liable to be toxified. The sulphur content in the base oil used in the present invention is preferably less than 15 ppm by mass, more preferably less than 10 ppm by mass and the most preferably less than 5 ppm by mass.

The base oil used in the present invention preferably has a kinetic viscosity at 100° C. of 2 to 5 mm$^2$/s. When the base oil has a kinetic viscosity at 100° C. of less than 2 mm$^2$/s, formation of oil films at lubricating sites may be insufficient, increasing wear, and when the base oil has a kinetic viscosity at 100° C. of above 5 mm$^2$/s, effects to reduce fuel consumption may decrease. The base oil preferably has a kinetic viscosity at 100° C. of 2 to 5 mm$^2$/s, more preferably 2 to 4.5 mm$^2$/s and the most preferably 2.5 to 4 mm$^2$/s. The viscosity index of the base oil used in the present invention is not particularly limited, and may generally be 90 or more, preferably 110 or more, more preferably 120 or more and the most preferably 125 or more. When the base oil has a viscosity index of less than 90, the viscosity at low temperatures may increase, which deteriorates the starting performance. In the present invention, the kinetic viscosity and the viscosity index are values obtained by measurements according to JIS K2283.

Specific examples of the base oil that may be used in the present invention include synthetic hydrocarbon base oils such as poly-α-olefins, ethylene-α-olefin copolymers, polybutenes and GTL (Gas to liquids) base oils; and mineral oil-based base oils fulfilling the above conditions of the content of the aromatic components and the sulphur content among paraffin mineral oils, normal-paraffin base oils, isoparaffin base oils or the like obtained by subjecting lubricating oil fractions obtained from crude oil by distillation under normal pressure and/or distillation under reduced pressure to one or more purification processes among solvent deasphalting, solvent extraction, hydrogenolysis, solvent dewaxing, contact dewaxing, hydrogenation refining, sulphuric acid cleaning and white clay treatment.

The base oil of the present invention may contain an ester base oil. However, the base oil preferably does not contain an ester base oil because improvements in lubricity effects of the component (A) may be insufficient, and if the base oil contains the ester base oil, the content thereof is preferably 3 parts by mass or less, more preferably 1 part by mass or less and the most preferably 0.5 parts by mass or less relative to 100 parts by mass of the hydrocarbon base oil. Examples of the ester base oil include dibasic acid esters such as adipic acid esters, azelaic acid esters, sebacic acid esters, dodecanedioic acid esters and dimer acid esters; and polyol esters such as trimethylolethane esters, trimethylolpropane esters and pentaerythritol esters.

[Component (A): Organic Molybdenum Compound]

The component (A) of the present invention is at least one organic molybdenum compound selected from the group consisting of a compound represented by general formula (1) and a compound represented by general formula (2). The component (A) is preferably a compound represented by general formula (1) because the compound does not contain phosphorus atoms in a molecule that may cause toxification of exhaust gas purification catalysts and has excellent thermal resistance.

In general formula (1), $R^1$ to $R^4$ respectively represent a hydrocarbon group having 1 to 18 carbon atoms. Examples of the hydrocarbon group having 1 to 18 carbon atoms include alkyl groups having 1 to 18 carbon atoms such as a methyl group, an ethyl group, a propyl group, an isopropyl group, a butyl group, an isobutyl group, a secondary butyl group, a t-butyl group, a pentyl group, an isopentyl group, a secondary pentyl group, a t-pentyl group, a branched pentyl group, a hexyl group, a secondary hexyl group, a branched hexyl group, a heptyl group, a secondary heptyl group, a branched heptyl group, an octyl group, a secondary octyl group, a branched octyl group, a nonyl group, a secondary nonyl group, a branched nonyl group, a decyl group, a secondary decyl group, a branched decyl group, a undecyl group, a secondary undecyl group, a branched undecyl group, a dodecyl group, a secondary dodecyl group, a branched dodecyl group, a tridecyl group, an isotridecyl group, a secondary tridecyl group, a branched tridecyl group, a tetradecyl group, a secondary tetradecyl group, a branched tetradecyl group, a hexadecyl group, a secondary hexadecyl group, a branched hexadecyl group, a stearyl group, a 2-methylpentyl group, a 2-ethylhexyl group, a 2-propylheptyl group, a 2-butyloctyl group, a 2-butyldecyl group, a 2-pentylnonyl group, a 2-hexyloctyl group, a 2-hexyldecyl group, a 2-hexyldodecyl group, a 2-heptylundecyl group, a 2-octyldecyl group, a monomethyl branched-isostearyl group and a 2,2,4,4-tetramethylpentyl group; alkenyl groups having 2 to 18 carbon atoms such as a vinyl group, an allyl group, a propenyl group, a butenyl group, an isobutenyl group, a pentenyl group, an isopentenyl group, a hexenyl group, a heptenyl group, an octenyl group, a nonenyl group, a decenyl group, a undecenyl group, a dodecenyl group, a tetradecenyl group and an oleyl group;

aryl groups having 6 to 18 carbon atoms such as a phenyl group, a methylphenyl group, a dimethylphenyl group, an isopropylphenyl group, a trimethylphenyl group, an ethylphenyl group, a propylphenyl group, a butylphenyl group, a pentylphenyl group, a hexylphenyl group, a heptylphenyl group, an octylphenyl group, a nonylphenyl group, a decylphenyl group, a undecylphenyl group, a dodecylphenyl group, a phenylphenyl group, a benzylphenyl group, a styrenated phenyl group, a p-cumylphenyl group, a dinonylphenyl group, an α-naphthyl group and a β-naphthyl group; aralkyl groups having 7 to 18 carbon atoms such as a benzyl group, a phenethyl group, a cumyl group, a hydrocinnamyl group, a benzhydryl group, a methylbenzyl group and a t-butylbenzyl group; cycloalkyl groups or cycloalkenyl groups having 5 to 18 carbon atoms such as a cyclopentyl group, a cyclohexyl group, a cycloheptyl group, a methylcyclopentyl group, a methylcyclohexyl group, a methylcycloheptyl group, a cyclopentenyl group, a cyclohexenyl group, a cycloheptenyl group, a methylcyclopentenyl group, a methylcyclohexenyl group and a methylcycloheptenyl group.

$R^1$ to $R^4$ are respectively preferably an alkyl group having 5 to 15 carbon atoms, more preferably an alkyl group having 6 to 14 carbon atoms and the most preferably an alkyl group having 7 to 14 carbon atoms because of excellent solubility in the base oil and lubricity. When $R^1$ to $R^4$ are respectively an alkyl group, a branched alkyl group is preferred to a linear alkyl group because of excellent solubility in the base oil. $R^1$ to $R^4$ may be the same groups or combinations of two or more groups; however, it is preferable that $R^1$ to $R^4$ are combinations of two or more groups because of excellent solubility in the base oil. For example, the compound wherein $R^1$ and $R^2$ are respectively 2-ethylhexyl and $R^3$ and $R^4$ are respectively a branched tridecyl group is preferable.

In general formula (1), $X^1$ to $X^4$ respectively represent an oxygen atom or a sulphur atom. Because of excellent lubricity, it is preferable that two to three of $X^1$ to $X^4$ are sulphur atoms and the rest are oxygen atom(s), it is more preferable that two of $X^1$ to $X^4$ are sulphur atoms and two are oxygen atoms and it is the most preferable that $X^1$ and $X^2$ are respectively a sulphur atom and $X^3$ and $X^4$ are respectively an oxygen atom.

Examples of the preferable organic molybdenum compound represented by general formula (1) include an organic molybdenum compound wherein $R^1$ and $R^2$ are respectively 2-ethylhexyl, $R^3$ and $R^4$ are respectively a branched tridecyl group, $X^1$ and $X^2$ are respectively a sulphur atom and $X^3$ and $X^4$ are respectively an oxygen atom.

In general formula (2), $R^5$ to $R^8$ respectively represent a hydrocarbon group having 1 to 18 carbon atoms. Examples of the hydrocarbon group having 1 to 18 carbon atoms include hydrocarbon groups exemplified for $R^1$ to $R^4$ in the general formula (1). It is preferable that $R^5$ to $R^8$ are respectively an alkyl group having 4 to 16 carbon atoms, more preferably an alkyl group having 6 to 14 carbon atoms and the most preferably an alkyl group having 8 to 12 carbon atoms because of excellent solubility in the base oil and lubricity. Specifically, it is preferable that $R^5$ to $R^8$ are respectively a 2-ethylhexyl group.

In general formula (2), $X^5$ to $X^8$ respectively represent an oxygen atom or a sulphur atom. Because of excellent lubricity, it is preferable that two to three of $X^5$ to $X^8$ are sulphur atoms and the rest are oxygen atom(s), it is more preferable that two of $X^5$ to $X^8$ are sulphur atoms and oxygen atoms, it is more preferable that two of $X^5$ to $X^8$ are sulphur atoms and two are oxygen atoms and it is the most preferable that $X^5$ and $X^6$ are respectively a sulphur atom and $X^7$ and $X^8$ are respectively an oxygen atom.

Examples of preferable organic molybdenum compounds represented by general formula (2) include an organic molybdenum compound wherein $R^5$ to $R^8$ are respectively 2-ethylhexyl, $X^5$ and $X^6$ are respectively a sulphur atom and $X^7$ and $X^8$ are respectively an oxygen atom.

The component (A) is preferably a compound represented by general formula (1) because the compound does not contain phosphorus atoms in a molecule and is thus unlikely to cause toxification of exhaust gas purification catalysts. The content of the component (A) in the internal combustion engine lubricating oil composition of the present invention is 300 to 1500 ppm by mass as molybdenum atoms relative to the whole amount of the internal combustion engine lubricating oil composition. When the content of the component (A) is less than 300 ppm by mass as molybdenum atoms, improvements in lubricity effects may not be obtained, and when the content is more than 1500 ppm by mass as molybdenum atoms, performance improvements commensurate with the added amount may not be obtained and toxification of exhaust gas purification catalysts and increased sludge may result. The content of the component (A) is preferably 300 to 1200 ppm by mass and more preferably 500 to 1000 ppm by mass as molybdenum atoms.

[Component (B): Borate Ester Compound]

The component (B) of the present invention is a borate ester compound. Examples of the borate ester compound include borate esters of monoalcohols, borated aliphatic epoxides, borated glycerol fatty acid esters, borated alkoxylated fatty acid amides and the like. Because of high decomposition suppression effects of the component (A), a borated aliphatic epoxide and a borated glycerol fatty acid ester are preferred and a borated glycerol fatty acid ester is more preferred.

Borate esters of monoalcohols are compounds obtained by dehydration condensation reaction of monoalcohols and boric acid. Because of excellent solubility in the base oil, aliphatic monools having 4 to 18 carbon atoms are preferred. Specifically, tributyl borate and trioctyl borate are preferred and tributyl borate is more preferred. Borated aliphatic epoxides are compounds obtained by reaction of aliphatic epoxides and boric acid or dehydration condensation reaction of aliphatic vicinal diols and boric acid. Because of excellent solubility in the base oil, the aliphatic epoxide is preferably an aliphatic 1,2-epoxide having 6 to 18 carbon atoms and the aliphatic vicinal diol is preferably an aliphatic 1,2-diol having 6 to 18 carbon atoms. Borated glycerol fatty acid esters are compounds obtained by reaction of glycerol trifatty acid esters, glycerol and boric acid or dehydration condensation reaction of glycerol partial fatty acid esters and boric acid. Because of excellent solubility in the base oil, the fatty acid is preferably a fatty acid having 8 to 18 carbon atoms. Specifically, as indicated in Production Example 1, a compound obtained by dehydration condensation reaction of glycerol monooleate ester and boric acid is preferred. Borated alkoxylated fatty acid amides are compounds obtained by dehydration condensation reaction of fatty acid monoethanolamide or fatty acid diethanolamide and boric acid. Among these, because of excellent solubility in the base oil, the fatty acid that forms the fatty acid monoethanolamide or the fatty acid diethanolamide is preferably a fatty acid having 8 to 18 carbon atoms.

The content of the component (B) in the internal combustion engine lubricating oil composition of the present invention is 100 to 1000 ppm by mass as boron atoms relative to the whole amount of the internal combustion engine lubricating oil composition of the present invention. When the content of the component (B) is less than 100 ppm by mass, an effect of decomposition suppression of the component (A) may be insufficient and when the content is more than 1000 ppm by mass, friction may be increased, sludge may increase and exhaust gas purification catalysts may be toxified. The content of the component (B) is preferably 110 to 800 ppm by mass, more preferably 130 to 600 ppm by mass and the most preferably 150 to 500 ppm by mass as boron atoms.

When the proportion of the component (B) relative to the component (A) is extremely low or high, decomposition suppression effects of the component (A) may be insufficient. Therefore, the mass ratio of boron atoms derived from the component (B) relative to molybdenum atoms derived from the component (A) is preferably 0.20 to 2.2, more preferably 0.22 to 1.8 and the most preferably 0.29 to 1.5.

[Component (C): Metal-Based Cleaner]

Metal-based cleaners used for internal combustion engine lubricating oils include alkaline earth metal sulphonates, alkaline earth metal phenates, alkaline earth metal salicylates, alkaline earth metal phosphonates and the like, and examples of the alkaline earth metal include magnesium, calcium, barium and the like. The internal combustion engine lubricating oil composition of the present invention preferably contains, as a component (C), at least one metal-based cleaner selected from the group consisting of calcium-based cleaners and magnesium-based cleaners at 0.05% to 0.4% by mass as a sum of calcium atoms and magnesium atoms relative to the whole amount of the internal combustion engine lubricating oil composition of the present invention, because decomposition of the component (A) may be prevented. Examples of the component (C) include calcium phenate, calcium salicylate, calcium phosphonate, magnesium phenate, magnesium salicylate, magnesium phosphonate and the like of which calcium salicylate, calcium phosphonate and magnesium salicylate are preferred and calcium salicylate is more preferred. Generally, a metal-based cleaner has an increased TBN by including a carbonate salt of an alkaline earth metal, and the component (C) of the present invention may contain a borate salt instead of some of the carbonate salt.

When the content of the component (C) is less than 0.05% by mass as a sum of calcium atoms and magnesium atoms, decomposition suppression effects of the component (A) may be insufficient, and when the content is more than 0.4% by mass, sludge may be generated. The content of the component (C) in the internal combustion engine lubricating oil composition of the present invention is preferably 0.05% to 0.25% by mass and more preferably 0.1% to 0.20% by mass as a sum of calcium atoms and magnesium atoms.

Metal-based cleaners having a total base number (TBN) according to ASTM D2896 of 20 to 600 mgKOH/g are known. When the TBN is extremely low, a high amount of metal-based cleaner must be added, and when the TBN is extremely high, the sustainability of the lubricity of the component (A) may be adversely affected. The component (C) preferably has a TBN of 50 to 500 mgKOH/g, more preferably 100 to 400 mgKOH/g and the most preferably 100 to 200 mgKOH/g.

[Component (D): Succinimide Dispersant]

Internal combustion engine lubricating oils generally contain ashless dispersants in order to prevent sedimentation of sludge due to dispersion and solubilization of sludge and solubilization of sludge deposits (stable sludge precursors). Examples of the ashless dispersant include succinimide dispersants obtained by condensation reaction of alkenyl succinic anhydrides and polyamine compounds, succinate ester dispersants obtained by condensation reaction of alkenyl succinic anhydrides and polyol compounds, succinate ester amide dispersants obtained by condensation reaction of alkenyl succinic anhydrides and alkanolamines, Mannich base dispersants obtained by condensation of alkylphenols and polyamines with formaldehyde, borated substances thereof and the like. The internal combustion engine lubricating oil composition of the present invention preferably contains, as a component (D), a succinimide dispersant at 0.5% to 10% by mass relative to the whole amount of the internal combustion engine lubricating oil composition of the present invention because decomposition of the component (A) may be prevented. The succinimide dispersant is a compound represented by the following general formula (4) or (5):

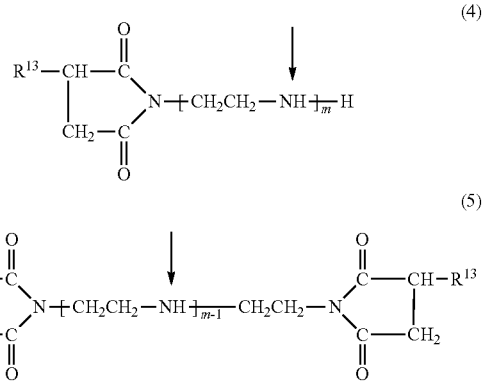

wherein $R^{13}$ represents an alkenyl group, and m represents a number of 2 to 10.

In general formulae (4) and (5), $R^{13}$ represents an alkenyl group. The alkenyl group is preferably a polybutenyl group and the alkenyl group preferably has a number average molecular weight of 300 to 10,000 and more preferably 300 to 4000. m is a number of 2 to 10 and preferably a number of 2 to 4. Boron-modified substances of the succinimide dispersants represented by general formulae (4) and (5) are obtained by dehydration condensation of boric acid and some or all amino groups at the positions indicated with arrows in general formulae (4) and (5), respectively, and preferably contain 0.1% to 5% by mass of boron atoms. Alkenyl succinimide dispersants are produced by reaction of polyalkylene polyamines and alkenyl succinic anhydrides obtained by reaction of polyolefins and maleic anhydride. Marketed products are generally mixtures of the compound represented by general formula (4) and the compound represented by general formula (5), and the ratio therebetween is decided according to the charge ratio of alkenyl succinic anhydrides and polyalkylene polyamines during production of the succinimide dispersants. Therefore, marketed products containing a higher amount of the compound represented by general formula (4) may be referred to as monoalkenyl succinimides and marketed products containing a higher amount of the compound represented by the general formula (5) may be referred to as dialkenyl succinimides. When the content of the component (D) is less than 0.5% by mass, decomposition suppression effects of the component (A) may be insufficient, and when the content is more than 10% by mass, the internal combustion engine lubricating oil may have deteriorated properties.

[Component (E): Zinc Dithiophosphate Compound]

Internal combustion engine lubricating oils generally contain zinc dithiophosphate compounds for the purpose of prevention of corrosion, load bearing improvement, prevention of wear or the like. The internal combustion engine lubricating oil composition of the present invention preferably contains, as a component (E), a zinc dithiophosphate compound represented by the following general formula (3) at 200 to 800 ppm by mass as phosphorus atoms relative to the whole amount of the internal combustion engine lubricating oil composition of the present invention because decomposition of the component (A) may be suppressed:

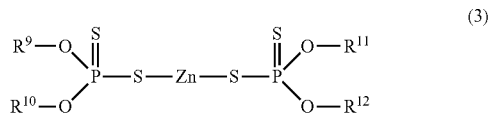

(3)

wherein $R^9$ to $R^{12}$ respectively represent a hydrocarbon group having 6 to 18 carbon atoms.

In the general formula (3), $R^9$ to $R^{12}$ respectively represent a hydrocarbon group having 6 to 18 carbon atoms. Examples of the hydrocarbon group having 6 to 18 carbon atoms include linear alkyl groups having 6 to 18 carbon atoms such as a hexyl group, a heptyl group, an octyl group, a nonyl group, a decyl group, a undecyl group, a dodecyl group, a tridecyl group, a tetradecyl group, a hexadecyl group and an octadecyl group; branched alkyl groups having 6 to 18 carbon atoms such as a 2-methylpentyl group, a 2-ethylhexyl group, a 2-propylheptyl group, a 2-butyloctyl group, a 2-butyldecyl group, a 2-pentylnonyl group, a 2-hexyloctyl group, a 2-hexyldecyl group, a 2-hexyldodecyl group, a 2-heptylundecyl group, a 2-octyldecyl group, a monomethyl branched-isostearyl group, a 2,2,4,4-tetramethylpentyl group, an isoheptyl group and an isotridecyl group; secondary alkyl groups having 7 to 18 carbon atoms such as a 4-methyl-2-pentyl group, a secondary hexyl group, a secondary heptyl group, a secondary octyl group, a secondary nonyl group, a secondary decyl group, a secondary undecyl group, a secondary dodecyl group, a secondary tridecyl group, a secondary tetradecyl group and a secondary hexadecyl group; alkenyl groups having 7 to 18 carbon atoms such as a heptenyl group, an octenyl group, a nonenyl group, a decenyl group, a undecenyl group, a dodecenyl group, a tetradecenyl group and an oleyl group;

aryl groups having 6 to 18 carbon atoms such as a phenyl group, a methylphenyl group, a dimethylphenyl group, an isopropylphenyl group, a trimethylphenyl group, an ethylphenyl group, a propylphenyl group, a butylphenyl group, a pentylphenyl group, a hexylphenyl group, a heptylphenyl group, an octylphenyl group, a nonylphenyl group, a decylphenyl group, a undecylphenyl group, a dodecylphenyl group, a phenylphenyl group, a benzylphenyl group, a styrenated phenyl group, a p-cumylphenyl group, a dinonylphenyl group, an α-naphthyl group and a β-naphthyl group; aralkyl groups having 7 to 18 carbon atoms such as a benzyl group, a phenethyl group, a cumyl group, a hydrocinnamyl group, a benzhydryl group, a methylbenzyl group and a t-butylbenzyl group; cycloalkyl groups or cycloalkenyl groups having 6 to 18 carbon atoms such as a cyclohexyl group, a cycloheptyl group, a methylcyclohexyl group, a methylcycloheptyl group, a cyclopentenyl group, a cyclohexenyl group, a cycloheptenyl group, a methylcyclopentenyl group, a methylcyclohexenyl group and a methylcycloheptenyl group, and the like.

It is preferable that $R^9$ to $R^{12}$ are respectively an alkyl group having 6 to 14 carbon atoms, more preferably an alkyl group having 6 to 10 carbon atoms and the most preferably an alkyl group having 6 to 8 carbon atoms because of a high friction reduction effect and a high decomposition suppression effect of the component (A), and the alkyl group is preferably a branched alkyl group. $R^9$ to $R^{12}$ may be the same group or different groups. Specifically, it is preferable that $R^9$ to $R^{12}$ are respectively a 4-methyl-2-pentyl group, an octyl group or a 2-ethylhexyl group and more preferably a 4-methyl-2-pentyl group.

When the content of the component (E) is less than 200 ppm by mass as phosphorus atoms, a decomposition suppression effect of the component (A) may be insufficient, and when the content is more than 800 ppm by mass, an effect commensurate with the added amount may not be obtained, exhaust gas purification catalysts may be toxified and decomposition of the component (A) may be promoted instead. Therefore, the content of the component (E) is more preferably 350 to 800 ppm by mass as phosphorus atoms and the most preferably 500 to 800 ppm by mass as phosphorus atoms.

Internal combustion engine lubricating oil compositions generally contain zinc dialkyldithiophosphates having 1 to 5 carbon atoms in an alkyl group. The internal combustion engine lubricating oil composition of the present invention preferably does not contain a zinc dialkyldithiophosphate having 1 to 5 carbon atoms in an alkyl group because the compound may decrease the decomposition suppression effect of the component (A) by the component (E), and if contained, the proportion of phosphorus atoms of the zinc dialkyldithiophosphate having 1 to 5 carbon atoms in an alkyl group is preferably 50 parts by mass or less and more preferably 20 parts by mass or less relative to 100 parts by mass of phosphorus atoms of the component (E). In addition, because exhaust gas purification catalysts may be toxified, the total content of the component (E) and the zinc dialkyldithiophosphate having 1 to 5 carbon atoms in an alkyl group is preferably 800 ppm by mass or less as phosphorus atoms.

[Component (F): Antioxidants]

As antioxidants for internal combustion engine lubricating oils, amine antioxidants, phenolic antioxidants, phenothiazine antioxidants, thioether antioxidants, phosphite ester antioxidants and the like are used. The internal combustion engine lubricating oil composition of the present invention preferably contains, as a component (F), at least one antioxidant selected from the group consisting of phenolic antioxidants and amine antioxidants at 0.1% to 1% by mass relative to the whole amount of the internal combustion engine lubricating oil composition of the present invention because decomposition of the component (A) may be suppressed.

Examples of the phenolic antioxidant include 2,6-di-t-butylphenol, 2,6-di-t-butyl-p-cresol, 2,6-di-t-butyl-4-methylphenol, 2,6-di-t-butyl-4-ethylphenol, 2,4-dimethyl-6-t-butylphenol, 4,4'-methylenebis(2,6-di-t-butylphenol), 4,4'-bis(2,6-di-t-butylphenol), 4,4'-bis(2-methyl-6-t-butylphenol), 2,2'-methylenebis(4-methyl-6-t-butylphenol), 2,2'-methylenebis(4-ethyl-6-t-butylphenol), 4,4'-butylidenebis(3-methyl-6-t-butylphenol), 4,4'-isopropylidenebis(2,6-di-t-butylphenol), 2,2'-methylenebis(4-methyl-6-cyclohexylphenol), 2,2'-methylenebis(4-methyl-6-nonylphenol), 2,2'-isobutylidenebis(4,6-dimethylphenol), 2,6-bis(2'-hydroxy-3'-t-butyl-5'-methylbenzyl)-4-methylphenol, 3-t-butyl-4-hydroxyanisole, 2-t-butyl-4-hydroxyanisole, octyl 3-(4-hydroxy-3,5-di-t-butylphenyl)propionate, 3-(4-hydroxy-3,5-di-t-butylphenyl)propionate-2-ethylhexyl, stearyl 3-(4-hydroxy-3,5-di-t-butylphenyl)propionate, oleyl 3-(4-hydroxy-3,5-di-t-butylphenyl)propionate, dodecyl 3-(4-hydroxy-3,5-di-t-butylphenyl)propionate, decyl 3-(4-hydroxy-3,5-di-t-butylphenyl)propionate, octyl 3-(4-hydroxy-3,5-di-t-butylphenyl)propionate, tetrakis{3-(4-hydroxy-3,5-di-t-butylphenyl)propionyloxymethyl} methane, 3-(4-hydroxy-3,5-di-t-butylphenyl)propionate glycerol monoester, ester of 3-(4-hydroxy-3,5-di-t-butylphenyl)propionic acid and glycerol monooleyl ether, 3-(4-hydroxy-3,5-di-t-butylphenyl) propionate butylene glycol diester, 3-(4-hydroxy-3,5-di-t-butylphenyl)propionate thiodiglycol diester, 4,4'-thiobis(3-methyl-6-t-butylphenol), 4,4'-thiobis(2-methyl-6-t-butylphenol), 2,2'-thiobis(4-methyl-6-t-butylphenol), 2,6-di-t-butyl-α-dimethylamino-p-cresol, 2,6-di-t-butyl-4-(N,N'-dimethylaminomethylphenol), bis(3,5-di-t-butyl-4-hydroxybenzyl)sulphide, tris{(3,5-di-t-butyl-4-hydroxyphenyl)propionyl-oxyethyl}isocyanurate, tris(3,5-di-t-butyl-4-hydroxyphenyl)isocyanurate, 1,3,5-tris(3,5-di-t-butyl-4-hydroxybenzyl)isocyanurate, bis{2-methyl-4-(3-n-alkylthiopropionyloxy)-5-t-butylphenyl}sulphide, 1,3,5-tris(4-t-butyl-3-hydroxy-2,6-dimethylbenzyl)isocyanurate, tetraphthaloyl-di(2,6-dimethyl-4-t-butyl-3-hydroxybenzylsulphide), 6-(4-hydroxy-3,5-di-t-butylanilino)-2,4-bis (octylthio)-1,3,5-triazine, 2,2-thio-{diethylbis-3-(3,5-di-t-butyl-4-hydroxyphenyl)}propionate, N,N'-hexamethylenebis(3,5-di-t-butyl-4-hydroxy-hydrocinnamide), 3,5-di-t-butyl-4-hydroxy-benzylphosphate diester, bis(3-methyl-4-hydroxy-5-t-butylbenzyl)sulphide, 3,9-bis[1,1-dimethyl-2-{β-(3-t-butyl-4-hydroxy-5-methylphenyl)propionyloxy}ethyl]-2,4,8,10-tetraoxaspiro[5,5]undecane, 1,1,3-tris(2-methyl-4-hydroxy-5-t-butylphenyl)butane, 1,3,5-trimethyl-2,4,6-tris(3,5-di-t-butyl-4-hydroxybenzyl)benzene, bis{3,3'-bis-(4'-hydroxy-3'-t-butylphenyl)butyric acid}glycol ester and the like. Among these, because of excellent solubility in the base oil and a high effect of decomposition suppression of the component (A), octyl 3-(4-hydroxy-3,5-di-t-butylphenyl) propionate and 3-(4-hydroxy-3,5-di-t-butylphenyl)propionate-2-ethylhexyl are preferred.

Examples of the amine antioxidant include naphthylamine antioxidants such as 1-naphthylamine, phenyl-1-naphthylamine, p-octylphenyl-1-naphthylamine, p-nonylphenyl-1-naphthylamine, p-dodecylphenyl-1-naphthylamine and phenyl-2-naphthylamine; phenylenediamine antioxidants such as N,N'-diisopropyl-p-phenylenediamine, N,N'-diisobutyl-p-phenylenediamine, N,N'-diphenyl-p-phenylenediamine, N,N'-di-β-naphthyl-p-phenylenediamine, N-phenyl-N'-isopropyl-p-phenylenediamine, N-cyclohexyl-N'-phenyl-p-phenylenediamine, N-1,3-dimethylbutyl-N'-phenyl-p-phenylenediamine, dioctyl-p-phenylenediamine, phenylhexyl-p-phenylenediamine and phenyloctyl-p-phenylenediamine; diphenylamine antioxidants such as dipyridylamine, diphenylamine, p,p'-di-n-butyl diphenylamine, p,p'-di-t-butyl diphenylamine, p,p'-di-t-pentyl diphenylamine, p,p'-dioctyl diphenylamine, p,p'-dinonyl diphenylamine, p,p'-didecyl diphenylamine, p,p'-didodecyl diphenylamine, p,p'-distyryl diphenylamine, p,p'-dimethoxy diphenylamine, 4,4'-bis(4-α,α-dimethylbenzoyl)diphenylamine, p-isopropoxy diphenylamine and dipyridylamine; phenothiazine antioxidants such as phenothiazine, N-methylphenothiazine, N-ethylphenothiazine, 3,7-dioctylphenothiazine, phenothiazine carboxylate ester and phenoselenazine, and the like. Among these, diphenylamine antioxidants are preferred, p,p'-dioctyl diphenylamine and p,p'-dinonyl diphenylamine are more preferred and p,p'-dioctyl diphenylamine is still more preferred because of excellent oxidation prevention ability at high temperatures.

When the content of the component (F) is less than 0.1% by mass, sufficient effects may not be exhibited, and when it is more than 1% by mass, an effect commensurate with the added amount may not be obtained, and rather, decomposition of the component (A) may be promoted. Therefore, the content of the component (F) is more preferably 0.15% to 0.95% by mass and the most preferably 0.2% to 0.9% by mass.

The component (F) used is preferably a phenolic antioxidant and more preferably a combination of a phenolic antioxidant and an amine antioxidant. When a phenolic antioxidant and an amine antioxidant are used in combination, the amine antioxidant is preferably 5 to 100 parts by mass and more preferably 10 to 70 parts by mass relative to the 100 parts by mass of the phenolic antioxidant because of an increased oxidation prevention effect.

The internal combustion engine lubricating oil composition of the present invention may further contain other lubricant additives that are generally used for internal combustion engine lubricating oils. Examples of the lubricant additive include (G1) a phosphorus-based anti-wear agent or phosphorus-based antioxidant, (G2) a sulphur-based extreme pressure agent, (G3) a sulphur-based antioxidant, (G4) a thiophosphate extreme pressure agent, (G5) an oiliness agent, (G6) a rust preventing agent, (G7) a viscosity index improver, (G8) a metal deactivator, (G9) a defoaming agent, (G10) a solid lubricant and the like.

Examples of (G1) the phosphorus-based anti-wear agent or phosphorus-based antioxidant include organic phosphines, organic phosphine oxides, organic phosphinites, organic phosphonites, organic phosphinates, organic phosphites, organic phosphonates, organic phosphates, organic phosphoroamidates and the like.

Examples of (G2) the sulphur-based extreme pressure agent include sulphurized oil, sulphurized mineral oil, organic mono- or poly-sulphides, sulphurized polyolefins, 1,3,4-thiadiazole derivatives, thiuram disulphides, dithiocarbamate esters and the like.

Examples of (G3) the sulphur-based antioxidant include thiodipropionate esters, thiobis(phenol) compounds, polyhydric alcohol esters of alkylthiopropionic acids, 2-mercaptobenzimidazole, dilauryl sulphide, amyl thioglycolate and the like.

Examples of (G4) the thiophosphate extreme pressure agent include organic trithiophosphites, organic thiophosphates and the like.

The total amount of the components (G1) to (G4) added is preferably about 0.1% to 20% by mass relative to the whole lubricating oil composition. However, it is preferable that the phosphorus content of the whole composition does not exceed 1000 ppm by mass and the sulphur content does not exceed 5000 ppm by mass because exhaust gas purification catalysts may be toxified.

Examples of (G5) the oiliness agent include fatty acids such as hexanoic acid, octanoic acid, pelargonic acid, decanoic acid, lauric acid, myristic acid, palmitic acid, stearic acid, oleic acid, behenic acid, linoleic acid and linolenic acid; oils and fats such as linseed oil, perilla oil, oiticica oil, olive oil, cacao oil, kapok oil, white mustard oil, sesame oil, rice bran oil, safflower oil, shea nut oil, Chinese wood oil, soy bean oil, tea seed oil, camellia oil, corn oil, rapeseed oil, palm oil, palm kernel oil, castor oil, sunflower oil, cotton seed oil, coconut oil, Japan wax, peanut oil, horse fat, beef tallow, neatsfoot oil, ghee, lard, goat suet, mutton suet, cream, fish oil and whale oil or hydrogenation or partial saponification products thereof; epoxidised oils and fats such as epoxidised soy bean oil and epoxidised linseed oil; epoxidised esters such as butyl epoxystearete and octyl epoxystearate; dibasic acids such as glutaric acid, adipic acid, pimelic acid, suberic acid, azelaic acid, sebacic acid, dodecanedioic acid and dimer acid; polycondensation products of hydroxystearic acids such as ricinoleic acid (castor oil fatty acid) and 12-hydroxystearic acid or esters of the polycondensation products with fatty acids; higher alcohols such as lauryl alcohol, myristyl alcohol, palmityl alcohol, stearyl alcohol, oleyl alcohol and behenyl alcohol; higher amines such as lauryl amine, myristyl amine, palmityl amine, stearyl amine, oleyl amine and behenyl amine; higher amides such as lauramide, myristylamide, palmitylamide, stearylamide, oleylamide and behenylamide; glycerides such as hexanoic acid mono/di/triglycerides, octanoic acid mono/di/triglycerides, decanoic acid mono/di/triglycerides, lauric acid mono/di/triglycerides, myristic acid mono/di/triglycerides, palmitic acid mono/di/triglycerides, stearic acid mono/di/triglycerides, oleic acid mono/di/triglycerides and behenic acid mono/di/triglycerides; polyglycerol esters such as hexanoic acid polyglycerol esters, octanoic acid polyglycerol esters, decanoic acid polyglycerol esters, lauric acid polyglycerol esters, myristic acid polyglycerol esters, palmitic acid polyglycerol esters, stearic acid polyglycerol esters, oleic acid polyglycerol esters and behenic acid polyglycerol esters; sorbitan esters such as hexanoic acid sorbitan esters, octanoic acid sorbitan esters, decanoic acid sorbitan esters, lauric acid sorbitan esters, myristic acid sorbitan esters, palmitic acid sorbitan esters, stearic acid sorbitan esters, oleic acid sorbitan esters and behenic acid sorbitan esters; polyglyceryl ethers such as polyglyceryl monooctyl ether, polyglyceryl monodecyl ether, polyglyceryl monolauryl ether, polyglyceryl monooleyl ether and polyglyceryl monostearyl ether; adducts of the above compounds with α-olefin oxides such as ethylene oxide, propylene oxide and dodecane-1,2-oxide, and the like. The amount of the component (G5) added is preferably about 0.05% to 15% by mass relative to the whole lubricating oil composition. When the amount of the component (G5) is less than 0.05% by mass, an effect of addition thereof may be insufficient, and when the amount exceeds 15% by mass, an effect commensurate with the added amount may not be obtained and viscosity properties such as viscosity index may be further decreased.

Examples of the component (G6), rust preventing agent, include oxidised paraffin wax calcium salts, oxidised paraffin wax magnesium salts, alkali metal salts, alkaline earth metal salts and amine salts of tallow fatty acids, alkenyl succinic esters and alkenyl succinic half-esters (molecular weight of the alkenyl group is about 100 to 300), sorbitan monoesters, pentaerythritol monoesters, glycerol monoesters, nonylphenol ethoxylates, lanolin fatty acid esters, lanolin fatty acid calcium salts and the like. The amount of the component (G6) added is preferably about 0.1% to 15% by mass relative to the whole lubricating oil composition, which range allows sufficient exhibition of a rust preventing effect.

Examples of the component (G7), viscosity index improver, include poly(C1-18) alkyl methacrylates, (C1-18) alkyl acrylate/(C1-18) alkyl methacrylate copolymers, diethylaminoethyl methacrylate/(C1-18) alkyl methacrylate copolymers, ethylene/(C1-18) alkyl methacrylate copolymers, polyisobutylenes, polyalkylstyrenes, ethylene/propylene copolymers, styrene/maleic ester copolymers, styrene/maleamide copolymers, hydrogenated styrene/butadiene copolymers, hydrogenated styrene/isoprene copolymers and the like. The average molecular weight is about 10,000 to 1,500,000. The amount of the component (G7) added is preferably about 0.1% to 20% by mass relative to the whole lubricating oil composition.

Examples of the component (G8), metal deactivator, include N,N'-salicylidene-1,2-propanediamine, alizarin, tetraalkyl thiuram disulphides, benzotriazole, benzimidazole, 2-alkyl dithiobenzimidazoles, 2-alkyl dithiobenzothiazoles, 2-(N,N-dialkylthiocarbamoyl)benzothiazoles, 2,5-bis(alkyldithio)-1,3,4-thiadiazoles, 2,5-bis(N,N-dialkylthiocarbamoyl)-1,3,4-thiadiazoles and the like. The amount of the component (G8) added is preferably about 0.01% to 5% by mass relative to the whole lubricating oil composition.

Examples of the component (G9), defoaming agent, include polydimethylsilicone, trifluoropropylmethylsilicone, colloidal silica, polyalkyl acrylates, polyalkyl methacrylates, alcohol ethoxylates/propoxylates, fatty acid ethoxylates/propoxylates, sorbitan partial fatty acid esters and the like. The amount of the component (G9) added is preferably about 1 to 1000 ppm by mass relative to the whole lubricating oil composition.

Examples of the component (G10), solid lubricant, include graphite, molybdenum disulphide, polytetrafluoroethylene, fatty acid alkaline earth metal salts, mica, cadmium dichloride, cadmium diiodide, calcium fluoride, lead iodide, lead oxide, titanium carbide, titanium nitride, aluminium silicate, antimony oxide, cerium fluoride, polyethylene, diamond powder, silicon nitride, boron nitride, carbon fluoride, melamine isocyanurate and the like. The amount of the component (G10) added is preferably about 0.005% to 2% by mass relative to the whole lubricating oil composition. When the amount is less than 0.005% by mass, an effect of addition thereof may not be obtained, and when the amount is more than 2% by mass, flowability of the engine oil may be adversely affected.

One or more types of each of the components (G1) to (G10) may appropriately be added.

The internal combustion engine lubricating oil composition of the present invention may be used as internal combustion engine lubricating oils for any internal combustion engine, and is preferably used as engine oils for gasoline engine and diesel engines.

EXAMPLES

The present invention is hereinafter more specifically described by way of Examples. In Examples, "%" and "ppm" are based on the mass unless otherwise stated.

Production Example 1

Borated Glycerol Fatty Acid Ester

To a glass reactor, 100 g of glycerol monooleate ester and 11.7 g of boric acid were charged, heated to 150° C. while stirring and allowed to react under normal pressure for 3 hours while removing generated water followed by reduction of pressure to 100 hPa and continuation of reaction at 150° C. for 3 hours to synthesise borated glycerol fatty acid ester (boron content: 2.0%).

With the following compounds, lubricating oil compositions of Examples 1 to 25 and Comparative Examples 1 to 15 having the compositions indicated in Tables 1 to 3 were prepared. The values of the compositions indicated in the Tables 1 to 3 are in parts by mass when the whole amount is regarded as 100 parts by mass. The lubricating oil compositions had kinetic viscosities at 100° C. of 7.7 to 7.8 mm$^2$/s, which correspond to 0W-20 according to the SAE viscosity grade.

Base oil 1: Paraffin purified mineral oil having a total aromatic content of 0.2%, a sulphur content of 1 ppm, a kinetic viscosity at 100° C. of 4.2 mm²/s and a viscosity index of 124 Base oil 2: Purified mineral oil having a total aromatic content of 17%, a sulphur content of 1000 ppm, a kinetic viscosity at 100° C. of 4.4 mm²/s and a viscosity index of 102

The base oil used in Example 25 has an aromatic content of 0.39% and a sulphur content of 12.4 ppm.

The base oil used in Comparative Example 13 has an aromatic content of 17% and a sulphur content of 1000 ppm, the base oil used in Comparative Example 14 has an aromatic content of 5.9% and a sulphur content of 342 ppm, and the base oil used in Comparative Example 15 has an aromatic content of 2.1% and a sulphur content of 115 ppm.

A1: Compound of general formula (1), wherein $R^1$ and $R^2$ are respectively a 2-ethylhexyl group, $R^3$ and $R^4$ are respectively a branched tridecyl group, $X^1$ and $X^2$ are respectively a sulphur atom and $X^3$ and $X^4$ are respectively an oxygen atom (Mo content: 10%)

A2: Compound of general formula (1), wherein $R^1$ to $R^4$ are respectively a butyl group, $X^1$ and $X^2$ are respectively a sulphur atom and $X^3$ and $X^4$ are respectively an oxygen atom (Mo content: 27.4%)

A3: Compound of general formula (2), wherein $R^5$ to $R^8$ are respectively a 2-ethylhexyl group, $X^5$ and $X^6$ are respectively a sulphur atom and $X^7$ and $X^8$ are respectively an oxygen atom (Mo content: 9.1%)

B1: Tributyl borate (B content: 4.7%)
B2: Trioctyl borate (B content: 2.7%)
B3: Borated glycerol fatty acid ester of Production Example 1 (B content: 2.0%)
C1: Calcium salicylate (Ca content: 10%, TBN: 280 mgKOH/g)
C2: Calcium salicylate (Ca content: 6.4%, TBN: 165 mgKOH/g)
C3: Boron-modified calcium salicylate (Ca content: 10%, boron content: 0.5%, TBN: 275 mgKOH/g)
C4: Calcium sulphonate (Ca content: 11.4%, TBN: 300 mgKOH/g)
C5: Magnesium salicylate (Mg content: 6.0%, TBN: 280 mgKOH/g)
C'1: Barium sulphonate (Ba content: 6.8%, TBN: 10 mgKOH/g)
D1: Monoalkenyl succinimide
D2: Bisalkenyl succinimide
D3: Boron-modified alkenyl succinimide (boron content: 0.34%)
D'1: Mannich base dispersant
E1: Compound of general formula (3), wherein $R^9$ to $R^{12}$ are respectively a 4-methyl-2-pentyl group (phosphorus content: 8.5%)
E2: Compound of general formula (3), wherein $R^9$ to $R^{12}$ are respectively an octyl group (phosphorus content: 8.0%)
E3: Compound of general formula (3), wherein $R^9$ to $R^{12}$ are respectively a 2-ethylhexyl group (phosphorus content: 8.0%)
E'1: Compound of general formula (3), wherein $R^9$ to $R^{12}$ are respectively a butyl group (phosphorus content: 12.7%)
E'2: Compound of general formula (3), wherein $R^9$ to $R^{12}$ are respectively a 2-butyl group (phosphorus content: 12.9%)
F1: 3-(4-Hydroxy-3,5-di-t-butylphenyl)propionate-2-ethylhexyl
F'1: p,p'-Dioctyldiphenylamine
G6: Polymethacrylate viscosity index improver

[Stability Test Method]

Test method: A sample (200 mL) was placed in a 300-mL glass graduated cylinder which was placed in a thermostat bath of 150° C. and air was introduced into the sample at a flow rate of 10 L/h. Specimens taken before the test and 5 to 8 days after the start of the test were measured for coefficient of friction and residual rate of the component (A) according to the methods indicated below. The results are indicated in Tables 1 to 3. In Tables 1 to 3, "ND" indicates that the residual rate was less than 5% and "–" means that the coefficient of friction and residual rate were not measured.

[Conditions for Measurement of Coefficient of Friction]

Tester used: SRV tester (produced by Optimol Instruments Prüftechnik GmbH, model: type 3)

Evaluation conditions:
 The coefficient of friction is measured under line contact conditions of a cylinder on a plate.
 Load: 200 N
 Temperature: 80° C.
 Measurement time: 15 min
 Stroke: 1 mm
 Upper cylinder: ϕ15×22 mm (material: SUJ-2)
 Lower plate: ϕ24×6.85 mm (material: SUJ-2)

Evaluation method: The average coefficient of friction between 10 to 15 minutes is used for evaluation. A lower coefficient of friction indicates better lubricity.

[Residual Amount of the Organic Molybdenum Compound]

According to liquid chromatography, the content of an organic molybdenum compound is measured and the proportion of the content after the test relative to the content before the test is calculated in percentage.

|  | Example | | | | | |
|---|---|---|---|---|---|---|
|  | 1 | 2 | 3 | 4 | 5 | 6 |
| A1 | 0.70 | 0.07 | 0.70 | 0.70 | 0.55 | — |
| A2 | — | — | — | — | — | 0.26 |
| A3 | — | — | — | — | — | — |
| B1 | 0.32 | 0.43 | 1.0 | 1.7 | 0.43 | 0.43 |
| B2 | — | — | — | — | — | — |
| B3 | — | — | — | — | — | — |
| C1 | 1.8 | 1.8 | 1.8 | 1.8 | 18 | 1.8 |
| C2 | — | — | — | — | — | — |
| C3 | — | — | — | — | — | — |
| C4 | — | — | — | — | — | — |
| C5 | — | — | — | — | — | — |
| C'1 | — | — | — | — | — | — |
| D1 | 4.0 | 4.0 | 4.0 | 4.0 | 4.0 | 4.0 |
| D2 | — | — | — | — | — | — |
| D3 | — | — | — | — | — | — |
| D'1 | — | — | — | — | — | — |

-continued

|  |  |  |  |  |  |  |  |
|---|---|---|---|---|---|---|---|
| E1 |  | 0.80 | 0.80 | 0.80 | 0.80 | 0 80 | 0.80 |
| E2 |  | — | — | — | — | — | — |
| E3 |  | — | — | — | — | — | — |
| E'1 |  | — | — | — | — | — | — |
| E'2 |  | — | — | — | — | — | — |
| F1 |  | 0.6 | 0.6 | 0.6 | 0.6 | 0.6 | 0.6 |
| F'1 |  | 0.2 | 0.2 | 0.2 | 0.2 | 0.2 | 0.2 |
| G6 |  | 3.8 | 3.8 | 3.8 | 3.8 | 3.8 | 3.8 |
| Base oil 1 |  | Balance | Balance | Balance | Balance | Balance | Balance |
| Mo content ppm |  | 700 | 700 | 700 | 700 | 550 | 700 |
| B content ppm |  | 150 | 200 | 470 | 800 | 200 | 200 |
| B/Mo ratio |  | 0.21 | 0.29 | 0.67 | 1.14 | 0.37 | 0.29 |
| P content ppm |  | 700 | 700 | 700 | 700 | 700 | 700 |
| Ca content ppm |  | 1800 | 1800 | 1800 | 1800 | 1800 | 1800 |
| Mg content ppm |  | — | — | — | — | — | — |
| Ra content ppm |  | — | — | — | — | — | — |
| Friction coefficient (μ) | Before test | 0.057 | 0.057 | 0.055 | 0.058 | 0.057 | 0.055 |
|  | 5 days later | — | — | — | — | — | — |
|  | 6 days later | 0.056 | 0.057 | 0.058 | 0.059 | 0.059 | 0.058 |
|  | 7 days later | 0.148 | 0.060 | 0.066 | 0.057 | 0.155 | 0.162 |
|  | 8 days later | — | 0.144 | 0.067 | 0.065 | — | — |
| Residual rate (%) | Before test | 100 | 100 | 100 | 100 | 100 | 100 |
|  | 5 days later | — | — | — | — | — | — |
|  | 6 days later | 45 | 72 | 66 | 69 | 42 | 41 |
|  | 7 days later | ND | 33 | 59 | 64 | ND | ND |
|  | 8 days later | — | ND | 52 | 59 | — | — |

|  |  | Example |  |  |  |  |  |
|---|---|---|---|---|---|---|---|
|  |  | 7 | 8 | 9 | 10 | 11 | 12 |
| A1 |  | — | 0.42 | 0.70 | 0.70 | 0.70 | 0.70 |
| A2 |  | — | — | — | — | — | — |
| A3 |  | 0.77 | 0.31 | — | — | — | — |
| B1 |  | 0.43 | 0.43 | — | — | 0.43 | 0.43 |
| B2 |  | — | — | 0.74 | — | — | — |
| B3 |  | — | — | — | 1.0 | — | — |
| C1 |  | 1.8 | 1.8 | 1.8 | 1.8 | — | — |
| C2 |  | — | — | — | — | 2.8 | — |
| C3 |  | — | — | — | — | — | 1.8 |
| C4 |  | — | — | — | — | — | — |
| C5 |  | — | — | — | — | — | — |
| C'1 |  | — | — | — | — | — | — |
| D1 |  | 4.0 | 4.0 | 4.0 | 4.0 | 4.0 | 4.0 |
| D2 |  | — | — | — | — | — | — |
| D3 |  | — | — | — | — | — | — |
| D'1 |  | — | — | — | — | — | — |
| E1 |  | 0.80 | 0.80 | 0.80 | 0.80 | 0.80 | 0.80 |
| E2 |  | — | — | — | — | — | — |
| E3 |  | — | — | — | — | — | — |
| E'1 |  | — | — | — | — | — | — |
| E'2 |  | — | — | — | — | — | — |
| F1 |  | 0.6 | 0.6 | 0.6 | 0.6 | 0.6 | 0.6 |
| F'1 |  | 0.2 | 0.2 | 0.2 | 0.2 | 0.2 | 0.2 |
| G6 |  | 3.8 | 3.8 | 3.8 | 3.8 | 3.8 | 3.8 |
| Base oil 1 |  | Balance | Balance | Balance | Balance | Balance | Balance |
| Mo content ppm |  | 700 | 700 | 700 | 700 | 700 | 700 |
| B content ppm |  | 200 | 200 | 200 | 200 | 200 | 290 |
| B/Mo ratio |  | 0.29 | 0.29 | 0.29 | 0.29 | 0.29 | 0.41 |
| P content ppm |  | 950 | 800 | 700 | 700 | 700 | 700 |
| Ca content ppm |  | 1800 | 1800 | 1800 | 1800 | 1500 | 1800 |
| Mg content ppm |  | — | — | — | — | — | — |
| Ra content ppm |  | — | — | — | — | — | — |
| Friction coefficient (μ) | Before test | 0.048 | 0.052 | 0.056 | 0.053 | 0.059 | 0.058 |
|  | 5 days later | — | — | — | 0.060 | — | — |
|  | 6 days later | 0.047 | 0.051 | 0.059 | 0.081 | 0.058 | 0.056 |

-continued

|   |   |   |   |   |   |   |   |
|---|---|---|---|---|---|---|---|
|   | 7 days later | 0.058 | 0.061 | 0.061 | 0.165 | 0.092 | 0.068 |
|   | 8 days later | 0.088 | 0.090 | 0.098 | — | 0.171 | 0.154 |
| Residual rate (%) | Before test | 100 | 100 | 100 | 100 | 100 | 100 |
|   | 5 days later | — | — | — | 51 | — | — |
|   | 6 days later | 71 | 70 | 63 | 41 | 63 | 65 |
|   | 7 days later | 63 | 51 | 31 | ND | 32 | 36 |
|   | 8 days later | 38 | 18 | 20 | — | ND | ND |

|   |   | Example |   |   |   |   |   |   |
|---|---|---|---|---|---|---|---|---|
|   |   | 13 | 14 | 15 | 16 | 17 | 18 | 19 |
| A1 |   | 0.70 | 0.70 | 0.70 | 0.70 | 0.70 | 0.70 | 0.70 |
| A2 |   | — | — | — | — | — | — | — |
| A3 |   | — | — | — | — | — | — | — |
| B1 |   | 0.43 | 0.43 | 0.43 | 0.43 | 0.43 | 0.43 | 0.43 |
| B2 |   | — | — | — | — | — | — | — |
| B3 |   | — | — | — | — | — | — | — |
| C1 |   | 1.8 | 1.8 | 1.8 | 1.8 | 1.8 | 1.8 | 1.8 |
| C2 |   | — | — | — | — | — | — | — |
| C3 |   | — | — | — | — | — | — | — |
| C4 |   | 1.8 | — | — | — | — | — | — |
| C5 |   | — | 3.0 | — | — | — | — | — |
| C'1 |   | — | — | 2.9 | — | — | — | — |
| D1 |   | 4.0 | 4.0 | 4.0 | — | — | — | 4.0 |
| D2 |   | — | — | — | 4.0 | — | — | — |
| D3 |   | — | — | — | — | 4.0 | — | — |
| D'1 |   | — | — | — | — | — | 4.0 | — |
| E1 |   | 0.80 | 0.80 | 0.80 | 080 | 0.80 | 0.80 | — |
| E2 |   | — | — | — | — | — | — | 0.87 |
| E3 |   | — | — | — | — | — | — | — |
| E'1 |   | — | — | — | — | — | — | — |
| E'2 |   | — | — | — | — | — | — | — |
| F1 |   | 0.6 | 0.6 | 0.6 | 0.6 | 0.6 | 0.6 | 0.6 |
| F'1 |   | 0.2 | 0.2 | 0.2 | 0.2 | 0.2 | 0.2 | 0.2 |
| G6 |   | 3.8 | 3.8 | 3.8 | 3.8 | 3.8 | 3.8 | 3.8 |
| Base oil 1 |   | Balance | Balance | Balance | Balance | Balance | Balance | Balance |
| Base oil 2 |   | — | — | — | — | — | — | — |
| Mo content ppm |   | 700 | 700 | 700 | 700 | 700 | 700 | 700 |
| B content ppm |   | 200 | 200 | 200 | 200 | 300 | 200 | 700 |
| B/Mo ratio |   | 0.29 | 0.29 | 0.29 | 0.29 | 0.43 | 0.29 | 0.29 |
| P content ppm |   | 700 | 700 | 700 | 700 | 700 | 700 | 700 |
| Ca content ppm |   | 1800 | — | — | 1800 | 1800 | 1800 | 1800 |
| Mg content ppm |   | — | 1800 | — | — | — | — | — |
| Ba content ppm |   | — | — | 1800 | — | — | — | — |
| Friction coefficient (μ) | Before test | 0.056 | 0.058 | 0.057 | 0.056 | 0.056 | 0.057 | 0.057 |
|   | 5 days later | — | — | — | — | — | — | — |
|   | 6 days later | 0.058 | 0.057 | 0.058 | 0.056 | 0.058 | 0.059 | 0.058 |
|   | 7 days later | 0.095 | 0.102 | 0.138 | 0.090 | 0.061 | 0.078 | 0.085 |
|   | 8 days later | 0.155 | 0.143 | — | 0.146 | 0.112 | — | 0.123 |
| Residual rate (%) | Before test | 100 | 100 | 100 | 100 | 100 | 100 | 100 |
|   | 5 days later | — | — | — | — | — | — | — |
|   | 6 days later | 59 | 61 | 48 | 60 | 68 | 62 | 64 |
|   | 7 days later | 30 | ND | ND | 31 | 38 | 20 | 35 |
|   | 8 days later | ND | — | — | ND | ND | ND | ND |

-continued

|  |  | Example | | | | | |
|---|---|---|---|---|---|---|---|
|  |  | 20 | 21 | 22 | 23 | 24 | 25 |
| A1 | | 0.70 | 0.70 | 0.70 | 0.70 | 0.70 | 0.70 |
| A2 | | — | — | — | — | — | — |
| A3 | | — | — | — | — | — | — |
| B1 | | 0.43 | 0.43 | 0.43 | 0.43 | 0.43 | 0.43 |
| B2 | | — | — | — | — | — | — |
| B3 | | — | — | — | — | — | — |
| C1 | | 1.8 | 1.8 | 1.8 | 1.8 | 1.8 | 1.8 |
| C2 | | — | — | — | — | — | — |
| C3 | | — | — | — | — | — | — |
| C4 | | — | — | — | — | — | — |
| C5 | | — | — | — | — | — | — |
| C'1 | | — | — | — | — | — | — |
| D1 | | 4.0 | 4.0 | 4.0 | 4.0 | 4.0 | 4.0 |
| D2 | | — | — | — | — | — | — |
| D3 | | — | — | — | — | — | — |
| D'1 | | — | — | — | — | — | — |
| E1 | | — | — | — | 0.80 | 0.80 | 0.80 |
| E2 | | — | — | — | — | — | — |
| E3 | | 0.87 | — | — | — | — | — |
| E'1 | | — | 0.6 | — | — | — | — |
| E'2 | | — | — | 0.6 | — | — | — |
| F1 | | 0.6 | 0.6 | 0.6 | 1.2 | — | 0.6 |
| F'1 | | 0.2 | 0.2 | 0.2 | 0.3 | 0.8 | 0.2 |
| G6 | | 3.8 | 3.8 | 3.8 | 3.8 | 3.8 | 3.8 |
| Base oil 1 | | Balance | Balance | Balance | Balance | Balance | Balance |
| Base oil 2 | | — | — | — | — | — | 1.0 |
| Mo content ppm | | 700 | 700 | 700 | 700 | 700 | 700 |
| B content ppm | | 200 | 200 | 200 | 200 | 200 | 200 |
| B/Mo ratio | | 0.29 | 0.29 | 0.29 | 0.29 | 0.29 | 0.29 |
| P content ppm | | 700 | 700 | 700 | 700 | 700 | 700 |
| Ca content ppm | | 1800 | 1800 | 1800 | 1800 | 1800 | 1800 |
| Mg content ppm | | — | — | — | — | — | — |
| Ba content ppm | | — | — | — | — | — | — |
| Friction coefficient (μ) | Before test | 0.057 | 0.055 | 0.051 | 0.060 | 0.060 | 0.056 |
| | 5 days later | — | — | — | — | — | — |
| | 6 days later | 0.057 | 0.058 | 0.055 | 0.059 | 0.058 | 0.060 |
| | 7 days later | 0.089 | 0.131 | 0.125 | 0.073 | 0.078 | 0.071 |
| | 8 days later | 0.144 | — | — | — | — | 0.148 |
| Residual rate (%) | Before test | 100 | 100 | 100 | 100 | 100 | 100 |
| | 5 days later | — | — | — | — | — | — |
| | 6 days later | 62 | 62 | 58 | 61 | 57 | 75 |
| | 7 days later | 33 | ND | 11 | ND | ND | 23 |
| | 8 days later | ND | — | ND | — | — | ND |

|  | Comparative Example | | | | | | | |
|---|---|---|---|---|---|---|---|---|
|  | 1 | 2 | 3 | 4 | 5 | 6 | 7 | 8 |
| A1 | 0.70 | 0.70 | — | — | 0.42 | 0.70 | 0.70 | 0.70 |
| A2 | — | — | 0.26 | — | — | — | — | — |
| A3 | — | — | — | 0.77 | 0.31 | — | — | — |
| B1 | — | 4.3 | — | — | — | — | — | — |
| B2 | — | — | — | — | — | — | — | — |
| B3 | — | — | — | — | — | — | — | — |
| C1 | 1.8 | 1.8 | 1.8 | 1.8 | 1.8 | — | — | 2.0 |
| C2 | — | — | — | — | — | — | — | — |
| C3 | — | — | — | — | — | 1.8 | 6.0 | — |
| C4 | — | — | — | — | — | — | — | — |
| C5 | — | — | — | — | — | — | — | — |
| C'1 | — | — | — | — | — | — | — | — |
| D1 | 4.0 | 4.0 | 4.0 | 4.0 | 4.0 | 4.0 | 4.0 | — |
| D2 | — | — | — | — | — | — | — | — |

-continued

|  |  |  |  |  |  |  |  |  |
|---|---|---|---|---|---|---|---|---|
| D3 | — | — | — | — | — | — | — | 4.0 |
| D'1 | — | — | — | — | — | — | — | — |
| E1 | 0.80 | 0.80 | 0.80 | 0.80 | 0.80 | 0.80 | 0.80 | 0.80 |
| E2 | — | — | — | — | — | — | — | — |
| E3 | — | — | — | — | — | — | — | — |
| E'1 | — | — | — | — | — | — | — | — |
| E'2 | — | — | — | — | — | — | — | — |
| F1 | 0.6 | 0.6 | 0.6 | 0.6 | 0.6 | 0.6 | 0.6 | 0.6 |
| F'1 | 0.2 | 0.2 | 0.2 | 0.2 | 0.2 | 0.2 | 0.2 | 0.2 |
| G6 | 3.8 | 3.8 | 3.8 | 3.8 | 3.8 | 3.8 | 3.8 | 3.8 |
| Base oil 1 | Balance | Balance | Balance | Balance | Balance | Balance | Balance | Balance |
| Base oil 2 | — | — | — | — | — | — | — | — |
| Mo content ppm | 700 | 700 | 700 | 700 | 700 | 700 | 700 | 700 |
| B content ppm | 0 | 2000 | 0 | 0 | 0 | 100 | 300 | 90 |
| B/Mo ratio | — | 2.86 | — | — | — | 0.14 | 0.43 | 0.13 |
| P content ppm | 700 | 700 | 700 | 950 | 800 | 700 | 700 | 700 |
| Ca content ppm | 1800 | 1800 | 1800 | 1800 | 1800 | 1800 | 1800 | 1800 |
| Mg content ppm | — | — | — | — | — | — | — | — |
| Ba content ppm | — | — | — | — | — | — | — | — |
| Friction coefficient ($\mu$) Before test | 0.052 | 0.090 | 0.058 | 0.057 | 0.058 | 0.056 | 0.090 | 0.056 |
| 5 days later | 0.056 | — | 0.058 | 0.060 | 0.061 | 0.055 | 0.101 | 0.055 |
| 6 days later | 0.170 | 0.120 | 0.162 | 0.081 | 0.098 | 0.111 | 0.125 | 0.076 |
| 7 days later | 0.177 | 0.131 | — | 0.159 | 0.153 | 0.177 | 0.143 | 0.177 |
| 8 days later | — | 0.130 | — | — | — | — | — | — |
| Residual ratio (%) Before test | 100 | 100 | 100 | 100 | 100 | 100 | 100 | 100 |
| 5 days later | 42 | — | 48 | 84 | 73 | 59 | 60 | 59 |
| 6 days later | ND | 65 | ND | 37 | 26 | 25 | 25 | 25 |
| 7 days later | ND | 50 | — | ND | ND | ND | ND | ND |
| 8 days later | — | 48 | — | — | — | — | — | — |

|  | Comparative Example | | | | | | |
|---|---|---|---|---|---|---|---|
|  | 9 | 10 | 11 | 12 | 13 | 14 | 15 |
| A1 | 0.70 | — | — | — | 0.70 | 0.70 | 0.70 |
| A2 | — | — | — | — | — | — | — |
| A3 | — | — | — | — | — | — | — |
| B1 | — | 0.43 | — | — | 0.43 | 0.43 | 0.43 |
| B2 | — | — | 0.54 | — | — | — | — |
| B3 | — | — | — | 1.0 | — | — | — |
| C1 | 2.0 | 2.0 | 2.0 | 2.0 | 1.8 | 1.8 | 1.8 |
| C2 | — | — | — | — | — | — | — |
| C3 | — | — | — | — | — | — | — |
| C4 | — | — | — | — | — | — | — |
| C5 | — | — | — | — | — | — | — |
| C'1 | — | — | — | — | — | — | — |
| D1 | — | 4.0 | 4.0 | 4.0 | 4.0 | 4.0 | 4.0 |
| D2 | — | — | — | — | — | — | — |
| D3 | 8.0 | — | — | — | — | — | — |
| D'1 | — | — | — | — | — | — | — |
| E1 | 0.80 | 0.80 | 0.80 | 0.80 | 0.80 | 0.80 | 0.80 |
| E2 | — | — | — | — | — | — | — |
| E3 | — | — | — | — | — | — | — |
| E'1 | — | — | — | — | — | — | — |
| E'2 | — | — | — | — | — | — | — |
| F1 | 0.6 | 0.6 | 0.6 | 0.6 | 0.6 | 0.6 | 0.6 |
| F'1 | 0.2 | 0.2 | 0.2 | 0.2 | 0.2 | 0.2 | 0.2 |
| G6 | 3.8 | 3.8 | 3.8 | 3.8 | 3.8 | 3.8 | 3.8 |
| Base oil 1 | Balance | Balance | Balance | Balance | Balance | Balance | Balance |
| Base oil 2 | — | — | — | — | Balance | 30 | 10 |
| Mo content ppm | 700 | 0 | 0 | 0 | 700 | 700 | 700 |
| B content ppm | 200 | 200 | 200 | 200 | 200 | 200 | 200 |
| B/Mo ratio | 0.43 | — | — | — | 0.29 | 0.29 | 0.29 |
| P content ppm | 700 | 700 | 700 | 700 | 700 | 700 | 700 |
| Ca content ppm | 1800 | 1800 | 1800 | 1800 | 1800 | 1800 | 1800 |
| Mg content ppm | — | — | — | — | — | — | — |
| Ba content ppm | — | — | — | — | — | — | — |

-continued

| | | | | | | | | |
|---|---|---|---|---|---|---|---|---|
| Friction coefficient ($\mu$) | Before test | 0.062 | 0.157 | 0.155 | 0.161 | 0.054 | 0.056 | 0.053 |
| | 5 days later | 0.069 | — | — | — | 0.153 | 0.060 | 0.061 |
| | 6 days later | 0.168 | — | — | — | 0.161 | 0.142 | 0.108 |
| | 7 days later | — | — | — | — | — | 0.168 | 0.158 |
| | 8 days later | — | — | — | — | — | — | — |
| Residual ratio (%) | Before test | 100 | — | — | — | 100 | 100 | 100 |
| | 5 days later | 51 | — | — | — | 29 | 51 | 78 |
| | 6 days later | ND | — | — | — | ND | 32 | 37 |
| | 7 days later | — | — | — | — | — | ND | ND |
| | 8 days later | — | — | — | — | — | | |

The invention claimed is:

1. An internal combustion engine lubricating oil composition comprising:
a base oil that is a hydrocarbon oil containing less than 1% by mass of aromatic components and having a sulphur content of less than 20 ppm by mass;
at least one organic molybdenum compound, as a component (A), selected from the group consisting of a compound represented by the following formula (1) and a compound represented by the following formula (2) at 500 to 1500 ppm by mass as molybdenum atoms; and
a borate ester compound, as a component (B), at 200 to 800 ppm by mass as boron atoms,
wherein the borate ester compound is selected from the group consisting of a borate ester of aliphatic monools having 4 to 18 carbon atoms, a borated glycerol fatty acid ester obtained from a fatty acid having 8 to 18 carbon atoms, and a mixture thereof, and
wherein a mass ratio of boron atoms derived from the component (B) relative to molybdenum atoms derived from the component (A) is 0.20 to 1.5:

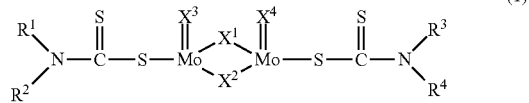

(1)

wherein $R^1$ to $R^4$ respectively represent an alkyl group having 7 to 14 carbon atoms, and $X^1$ to $X^4$ respectively represent an oxygen atom or a sulphur atom;

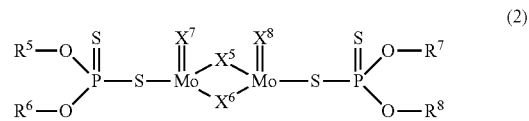

(2)

wherein $R^5$ to $R^8$ respectively represent an alkyl group having 8 to 12 carbon atoms, and $X^5$ to $X^8$ respectively represent an oxygen atom or a sulphur atom.

2. The internal combustion engine lubricating oil composition according to claim 1, further comprising, as a component (C), at least one metal-based cleaner selected from the group consisting of calcium-based cleaners and magnesium-based cleaners, wherein a total content of calcium atoms and magnesium atoms is 0.05% to 0.4% by mass.

3. The internal combustion engine lubricating oil composition according to claim 1, further comprising, as a component (D), a succinimide dispersant at 0.5% to 10% by mass.

4. The internal combustion engine lubricating oil composition according to claim 1, further comprising, as a component (E), a zinc dithiophosphate compound represented by the following formula (3) at 200 to 800 ppm by mass as phosphorus atoms:

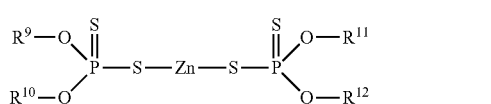

(3)

wherein $R^9$ to $R^{12}$ respectively represent a hydrocarbon group having 6 to 18 carbon atoms.

5. The internal combustion engine lubricating oil composition according to claim 1, further containing as a component (F), at least one antioxidant selected from the group consisting of phenolic antioxidants and amine antioxidants at 0.1% to 1% by mass.

6. A method for improving stability of an organic molybdenum compound in an internal combustion engine lubricating oil composition, comprising adding 200 to 800 ppm by mass of borate ester compound as boron atoms to the lubricating oil composition containing a base oil that is a hydrocarbon oil containing less than 1% by mass of aromatic components and having a sulphur content of less than 20 ppm by mass and at least one organic molybdenum compound selected from the group consisting of a compound represented by the following formula (1) and a compound represented by the following formula (2) at 500 to 1500 ppm by mass as molybdenum atoms,
wherein the borate ester compound is selected from the group consisting of a borate ester of aliphatic monools having 4 to 18 carbon atoms, a borated glycerol fatty acid ester obtained from a fatty acid having 8 to 18 carbon atoms, and a mixture thereof, and wherein a mass ratio of boron atoms derived from the component (B) relative to molybdenum atoms derived from the component (A) is 0.20 to 1.5:

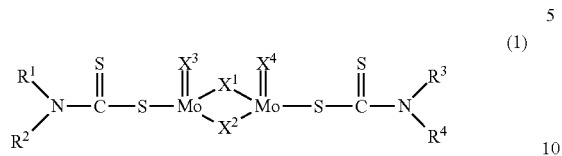

(1)

wherein $R^1$ to $R^4$ respectively represent an alkyl group having 7 to 14 carbon atoms, and $X^1$ to $X^4$ respectively represent an oxygen atom or a sulphur atom;

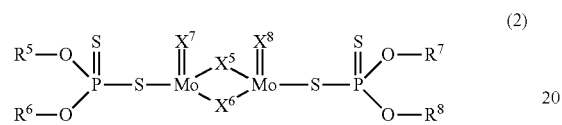

(2)

wherein $R^5$ to $R^8$ respectively represent an alkyl group having 8 to 12 carbon atoms, and $X^5$ to $X^8$ respectively represent an oxygen atom or a sulphur atom.

* * * * *